S. LIPPERT.
THERMAL VALVE AND TRAP FOR WET LINES.
APPLICATION FILED JUNE 10, 1916.
1,310,026.
Patented July 15, 1919.
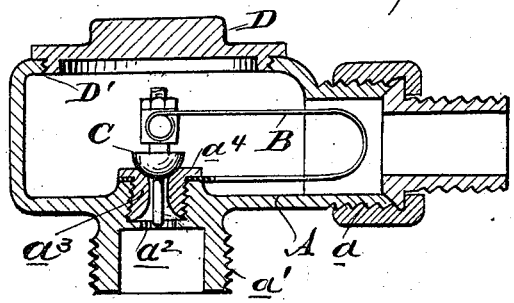
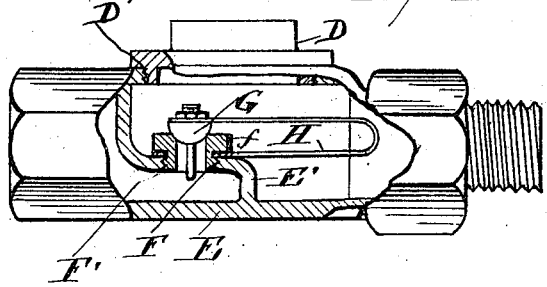
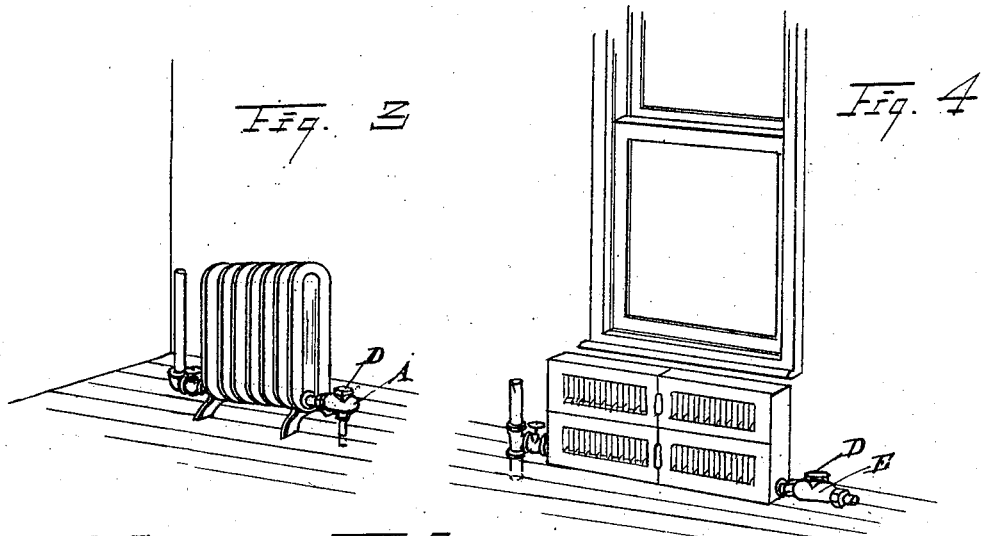
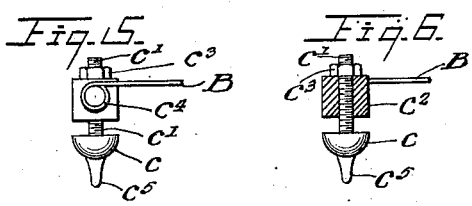
INVENTOR.
Samuel Lippert
BY
ATTORNEYS.

ced July 15, 1919.

UNITED STATES PATENT OFFICE.

SAMUEL LIPPERT, OF EAST CLEVELAND, OHIO.

THERMAL VALVE AND TRAP FOR WET LINES.

1,310,026.  Specification of Letters Patent.  Patented July 15, 1919.

Application filed June 10, 1916. Serial No. 102,823.

*To all whom it may concern:*

Be it known that I, SAMUEL LIPPERT, a citizen of the United States, and resident of East Cleveland, in the county of Cuyahoga and State of Ohio, have invented certain new and useful Improvements in Thermal Valves and Traps for Wet Lines, of which I hereby declare the following to be a full, clear, and exact description, such as will enable others skilled in the art to which it appertains to make and use the same.

The object of the invention is to provide a simple and efficient thermal valve and trap for collecting and eliminating all liquid such as oil and water of condensation collected in a steam heating coil or radiator and one particularly efficient in trapping and eliminating liquids from piping and radiators on the lower levels of the system in which oil and water are apt to collect, especially in basements.

The novel valve is particularly adapted for use in the horizontal position and is constructed to automatically withhold the hot steam from passing while readily permitting the liquids to pass.

It can be employed with or without a combined vacuum and pressure pump, and the exhausted water may be returned to the boiler or eliminated from the system as desired.

The valve of this invention embodies a horizontal chamber or pipe connection introduced into an exhaust pipe and having a dividing wall in which is located an outlet opening and a valve seat therein. It also includes a valve for this seat attached to one end of a looped thermal element, the other end of which is axially secured relatively to the outlet opening, which normally retains the valve out of engagement with its seat to permit liquids to flow from the outlet opening, but which expands when affected by the high temperature of the steam and closes the valve upon its seat, thus operating to prevent the escape of the steam and retain it in the coil or radiator until it cools and condenses, whereupon the thermal element contracts and removes the valve from its seat.

It includes a laminated metallic loop formed of different metals whose ratio of expansion differs at equal temperature, the outer layer being most expansive and therefore tending to close the ends of the loop together when affected by heat.

It also includes a loop having a valve attached to one extremity and having the other extremity attached in the axial line of the valve seat, whereby the valve will always return accurately to its seat, and the construction will permit of lateral distortion or rotation of the loop upon its point of attachment without affecting the accuracy of the movement of the valve.

It includes a valve chamber for pipe connection attachable to and detachable from the ordinary connections of the exhaust side of the coils or radiators.

The invention further includes the combination and arrangement of parts and construction of details hereinafter described, shown in the accompanying drawings and specifically pointed out in the claims.

In the accompanying drawings, Figure 1 is a longitudinal central section of the device; Fig. 2 is a similar view of a modified form thereof; Fig. 3 is a perspective view of a radiator to the exhaust end of which the device is attached; Fig. 4 is a similar view showing a modified form of device; Fig. 5 is an enlarged side elevation of the valve and its adjusting means; and Fig. 6 is a vertical section therethrough.

In these views in Fig. 1, A is a chamber provided with a screw threaded extremity $a$ for connection with the exhaust end of a radiator.

In the lower wall a similar screw threaded connection $a'$ is shown.

At this point an outlet opening $a^2$ is located in which is detachably secured a valve seat $a^3$. Clamped beneath the annular shoulder $a^4$ of this valve seat is secured one end of the thermal loop B and upon the other end is adjustably secured the valve C. This valve C is provided with a downwardly projecting guide or finder $c^5$ and with an upwardly extending screw threaded stem $c'$. The stem $c'$ passes through an internally threaded sleeve $c^2$ and receiving upon its upper end a clamping nut $c^3$, whereby the valve may be adjusted and clamped in any desired position with reference to the upper limb of the loop B. The extremity of the upper loop B is forked and attached to projecting lugs $c^4$ projecting laterally from the sleeve $c^2$.

A cover D is employed to close the upper opening D' through which the parts are accessible for assembling and readjustment.

In Fig. 2 the chamber E is divided by means of a partition E' in which the valve seat F is positioned in the outlet opening F'. The construction and manner of securing the thermal valve are slightly different from that illustrated in Fig. 1. G is the valve and H the thermal loop the lower limb of which is secured by means of the annular shoulder of the valve seat. The valve G is clamped to the loop by means of a nut similar to the nut $c^3$ of Figs. 1, 5, and 6. The loop may be adjusted to a certain extent by bending or distorting the same by hand.

The liquid passes longitudinally through the chamber or connection E. With this construction the thermal loop can be considerably distorted or rotated on its axial point of attachment without preventing the valve from closing accurately on its seat.

It is obvious that this construction of the valve lends itself to use with either a horizontal or vertical vacuum line, according to the position of the inlet and outlet openings, which can be arranged in the ends or in one end and side of the chamber.

Having thus described my invention, what I claim is:—

1. In a steam trap, a chamber provided with a horizontal division wall, inlet and outlet openings for said chamber on respective sides of said wall, a valve seat in said division wall, said valve seat having an outlet opening therein, and a thermal loop secured to said division wall, and a valve for said valve seat, the point of attachment of said thermal loop being so positioned as to seat said valve axially of said valve seat, the attached end of said loop being inserted between said valve seat and said partition.

2. In a steam trap, a chamber provided with inlet and outlet openings, a wall therein provided with an outlet opening leading to the outlet opening of said chamber, a detachable valve seat upon said wall adapted to be clamped over said last named opening, a thermal loop secured at one end beneath said valve seat, and a valve secured to the other end of said loop coöperating with said valve seat.

3. In a steam trap, a chamber provided with a division wall, and inlet and outlet openings, said wall being provided with an outlet opening leading to the outlet opening of said chamber, a detachable valve seat upon said division wall adapted to be clamped over said opening, a thermal loop secured at one end beneath said valve seat, and a valve adjustably secured to the other end of said loop for coöperation with said valve seat.

4. A steam trap, comprising a chamber having a passage at each end, a transverse partition in said chamber, said partition also having a portion at right angles thereto, a valve seat having an opening, and secured in said partition, a thermal loop secured at one end between said valve seat and said partition, and a valve upon the other end of said loop, the attached end of said loop being secured axially of said opening in said valve seat.

5. A steam trap, comprising a horizontal chamber having a passage at each end, and an opening in the top wall for access to the inclosed parts, a closure for said opening, a transverse partition in said chamber, said partition having a horizontal portion, a valve seat having an opening, and secured in said partition, a thermal loop secured at one end to said partition, and a valve upon the other end of said loop, said valve seat being provided with a shoulder engaging said thermal loop and compressing the same against said partition.

6. A steam trap for a horizontal steam line, comprising a horizontal chamber open at both ends, pipe connections at said chamber ends, an opening for access to the interior of the chamber, positioned intermediate of its ends, a closure therefor, a partition in the chamber having a horizontal portion, a vertically adjustable valve seat in said partition, said valve seat having an outlet opening, and also provided with an annular shoulder, a thermal loop, one end of which encircles said valve seat underneath said shoulder, and is clamped thereby upon said partition, and a valve secured upon the other end of said thermal loop.

7. A steam trap for a horizontal steam line, including a horizontal chamber open at both ends, pipe connections at said chamber ends, an opening for access to the interior of the chamber, positioned intermediate of its ends, a closure therefor, a partition in the chamber having a horizontal portion, a vertically adjustable valve seat in said partition, said valve seat having an outlet opening, and also provided with an annular shoulder, a thermal loop, one end of which encircles said valve seat underneath said shoulder, and is clamped thereby upon said partition, and a valve secured upon the other end of said thermal loop, and a projecting guide or finder upon said valve.

8. In a steam trap, the combination of a chamber provided with inlet and outlet openings, a wall in said chamber provided with a passage therethrough, a detachable valve seat mounted upon said wall over said opening, and a thermostatic loop secured at one end between said valve seat and said wall and having on its other end an adjustable valve member for coöperation with said valve seat.

In testimony whereof, I hereunto set my hand this 9 day of March 1916.

SAMUEL LIPPERT.

In presence of—
FRANK H. EWING,
E. V. LESLIE.

Copies of this patent may be obtained for five cents each, by addressing the "Commissioner of Patents, Washington, D. C."